United States Patent
Wang et al.

(10) Patent No.: US 9,368,841 B2
(45) Date of Patent: Jun. 14, 2016

(54) BATTERY POWER CAPABILITY ESTIMATION AT VEHICLE START

(71) Applicant: Ford Global Technologies, LLC, Dearborn, MI (US)

(72) Inventors: Xu Wang, Dearborn, MI (US); Yonghua Li, Ann Arbor, MI (US); Richard Dyche Anderson, Plymouth, MI (US); Kevin Vander Laan, Bloomfield Hills, MI (US); Xiaoguang Chang, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 14/014,992

(22) Filed: Aug. 30, 2013

(65) Prior Publication Data

US 2015/0064510 A1 Mar. 5, 2015

(51) Int. Cl.
  *H01M 10/48* (2006.01)
  *H01M 10/633* (2014.01)
  *H01M 10/63* (2014.01)

(52) U.S. Cl.
  CPC ............ *H01M 10/48* (2013.01); *H01M 10/486* (2013.01); *H01M 10/63* (2015.04); *H01M 10/633* (2015.04); *H01M 2220/20* (2013.01)

(58) Field of Classification Search
  CPC .............. H01M 10/63; H01M 10/633; H01M 2010/4271
  USPC ................... 702/63, 64, 130, 65; 340/636.11, 340/638.18, 636.2; 320/133, 132, 149
  See application file for complete search history.

(56) References Cited

U.S. PATENT DOCUMENTS

| | | |
|---|---|---|
| 7,321,220 B2 | 1/2008 | Plett |
| 7,764,049 B2 | 7/2010 | Iwane et al. |

(Continued)

FOREIGN PATENT DOCUMENTS

IN 2780/MUM/2011 10/2012

OTHER PUBLICATIONS

Gregory L. Plett, High-Performance Battery-Pack Power Estimation Using a Dynamic Cell Model, IEEE Transactions on Vehicular Technology, vol. 53, No. 5, Sep. 2004.

(Continued)

*Primary Examiner* — Scott J Chmielecki
(74) *Attorney, Agent, or Firm* — David Kelley; Brooks Kushman P.C.

(57) ABSTRACT

A vehicle is disclosed comprising a battery and a controller. Projected battery impedance parameters are calculated based on predetermined parameter values and historical parameter values generated by a battery parameter estimation model. The values may be weighted according to time data associated with the historical impedance parameter values and a temperature of the battery. Recent historical impedance parameter values may affect the projected battery impedance parameter values more than older historical impedance parameter values. The model is initialized with projected parameter values at vehicle initialization. Battery power capability is calculated using the projected parameter values for a period of time following vehicle initialization. After the period of time following vehicle initialization, battery power capability is calculated using impedance parameters generated by the model. The period of time following vehicle initialization may end when the model output has converged to a stable solution.

9 Claims, 5 Drawing Sheets

(56) References Cited

U.S. PATENT DOCUMENTS

| | | |
|---|---|---|
| 8,103,485 B2 | 1/2012 | Plett |
| 2012/0179435 A1 | 7/2012 | Song et al. |
| 2012/0200266 A1* | 8/2012 | Berkowitz ......... B60L 11/1861 320/139 |
| 2013/0090900 A1* | 4/2013 | Gering ............... G01R 31/3679 703/2 |
| 2013/0110429 A1* | 5/2013 | Mitsuyama .......... H01M 10/48 702/63 |
| 2014/0214268 A1 | 7/2014 | Li et al. |
| 2014/0266059 A1 | 9/2014 | Li et al. |

OTHER PUBLICATIONS

Gregory L. Plett, Results of Temperature-Dependent LiPB Cell Modeling for HEV SOC Estimation, Copyright 2005.

Rui Xiong, et al., Online Estimation of Peak Power Capability of Li-Ion Batteries in Electric Vehicles by a Hardware-in-Loop Approach, Energies 2012, 5, 1455-1469; doi:10.3390/en5051455, energies, ISSN 1996-1073, www.mdpi.com/journal/energies, May 15, 2012.

* cited by examiner

BATTERY POWER CAPABILITY ESTIMATION AT VEHICLE START

TECHNICAL FIELD

This application relates to a vehicle system for estimating traction battery power capability.

BACKGROUND

A hybrid-electric or all-electric vehicle has a traction battery to store and provide energy for vehicle propulsion. In order to improve performance and battery life, it is necessary to operate the battery within certain limits. Operating the battery outside of the limits may decrease the performance or life of the battery. An important quantity for controlling and operating the battery pack is the battery power capability. The battery power capability indicates how much power the battery is capable of providing (discharge) or receiving (charge) in order to meet driver and vehicle demands.

A battery pack may be modeled by an equivalent circuit model (ECM) having an arrangement of impedance components. The ECM may depend on the type and chemistry of the battery being used. The battery power capability may be calculated based on the battery impedance component values of the model. The battery impedance component values may vary with age and temperature of the battery.

A recursive parameter estimation method, such as an Extended Kalman Filter (EKF) may be used to identify battery equivalent circuit model impedance parameters. A shortcoming of the EKF is that it may require some time to converge to the true parameter values. The convergence time may be a function of the starting values that are used to initialize the EKF. The convergence of the EKF may be influenced by an efficient choice of the initial parameter values. A poor choice of initial EKF parameters may lead to divergence of the parameter identification process in which case a reasonable estimate of the true battery impedance parameter values may never be obtained. In addition, prior to convergence of the EKF, the battery impedance parameter estimates from the model may not provide acceptable results for calculating the battery power capability.

SUMMARY

A vehicle includes a battery and at least one controller. The controller is programmed to initialize a battery impedance parameter estimation model, which may be an EKF, with initial impedance parameter values derived from a set of predetermined impedance parameter values and historical impedance parameter values generated by the model. The predetermined impedance parameter values and the historical impedance parameter values are weighted according to time data associated with the historical impedance parameter values and a temperature present at initialization. The controller is further programmed to estimate impedance parameter values according to the model, calculate a battery power capability based on the estimated impedance parameter values, and operate the vehicle according to the battery power capability. Recent historical impedance parameter values may have more influence on the initial impedance parameter values than older historical impedance parameter values. Historical impedance parameter values may not affect the initial impedance parameter values when the temperature is less than a threshold. The temperature present at initialization may be a temperature associated with the battery. The predetermined impedance parameter values may be selected based on impedance parameter values learned during an immediately preceding ignition cycle.

A vehicle includes a battery and at least one controller. The controller is programmed to, for a period of time following vehicle initialization, calculate a battery power capability based on battery impedance parameters derived from a set of predetermined impedance parameters and historical impedance parameters. The predetermined impedance parameter values and the historical impedance parameter values are weighted according to time data associated with the historical impedance parameters and a temperature of the battery. The controller is further programmed to operate the vehicle according to the battery power capability. The controller may be further programmed to, in response to values of the temperature of the battery being less than a predetermined value during the period of time following vehicle initialization, calculate the battery power capability based on predetermined default data. The period of time may end when battery impedance parameters output by a battery parameter estimation model have converged to stable values. The controller may be further programmed to, after the period of time, calculate the battery power capability based on battery impedance parameters output by a battery impedance parameter estimation model, which may be an EKF. The controller may store battery impedance parameters output by the model with associated time data as additional historical impedance parameters. The predetermined impedance parameters may be selected based on impedance parameters learned during an immediately preceding ignition cycle. Values of the set of predetermined impedance parameters may be based on battery state of charge and battery temperature. Historical impedance parameters may not affect battery impedance parameter values when the temperature of the battery is less than a threshold. Recent historical impedance parameters may affect values of the impedance parameters more than older historical impedance parameters.

A method of controlling a battery includes calculating projected battery impedance parameters derived from a set of predetermined impedance parameter values and historical impedance parameter values, weighted according to time data associated with the historical impedance parameter values and a temperature of the battery. The method further includes initializing a battery parameter estimation model with projected battery impedance parameter values at vehicle initialization and generating impedance parameter values based on the model. The method further includes outputting a battery power capability based on projected battery impedance parameter values during a period of time following vehicle initialization and outputting the battery power capability based on the impedance parameter values generated by the model after the period of time following vehicle initialization. The method further includes controlling the battery in accordance with the battery power capability. Recent historical impedance parameter values may affect the projected battery impedance parameter values more than older historical impedance parameter values. Historical impedance parameter values may not affect the projected impedance parameter values when the temperature of the battery is less than a threshold. The period of time may end when battery impedance parameters output by the model have converged to stable values. Convergence may be detected when a sequence of distance values based on the estimated impedance parameters are decreasing and the final distance value of the sequence is below a threshold. Impedance parameter values output by the model may be stored with associated time data as additional historical impedance parameter values. The method may further include outputting a battery power capability based on predetermined default values when the temperature of the battery is less than a predetermined value during the period of time after initialization.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
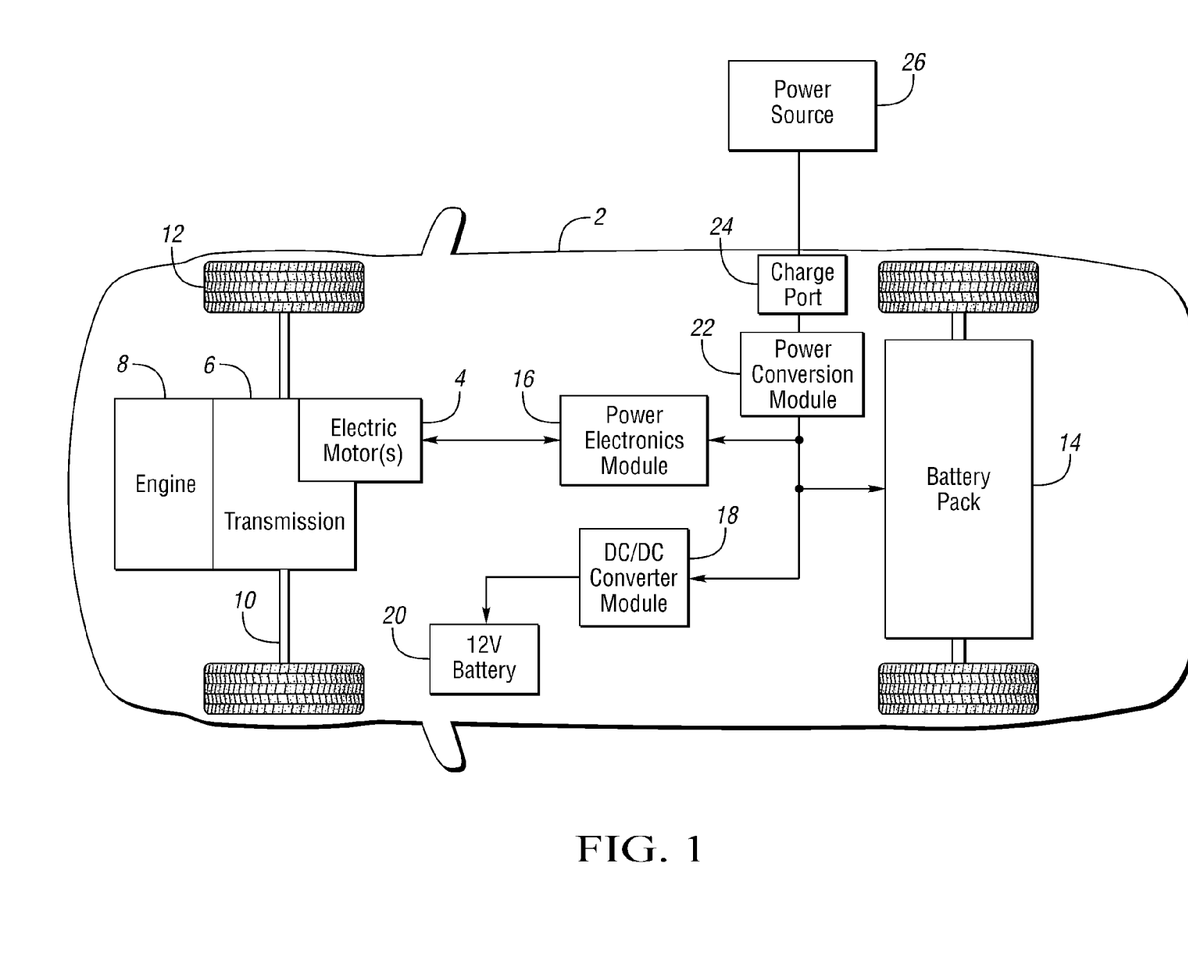
FIG. 1 is a diagram of a plug-in hybrid-electric vehicle illustrating typical drivetrain and energy storage components.

FIG. 1 depicts a typical plug-in hybrid-electric vehicle. A typical plug-in hybrid-electric vehicle 2 may comprise one or more electric motors 4 mechanically connected to a hybrid transmission 6. In addition, the hybrid transmission 6 is mechanically connected to an engine 8. The hybrid transmission 6 may also be mechanically connected to a drive shaft 10 that is mechanically connected to the wheels 12. The electric motors 4 can provide propulsion and deceleration capability when the engine 8 is turned on or off. The electric motors 4 may also act as generators and can provide fuel economy benefits by recovering energy that would normally be lost as heat in the friction braking system. The electric motors 4 may also reduce pollutant emissions since the hybrid electric vehicle 2 may be operated in electric mode under certain conditions.

The battery pack 14 stores energy that can be used by the electric motors 4. A vehicle battery pack 14 typically provides a high voltage DC output. The battery pack 14 is electrically connected to a power electronics module 16. The power electronics module 16 is also electrically connected to the electric motors 4 and provides the ability to bi-directionally transfer energy between the battery pack 14 and the electric motors 4. For example, a typical battery pack 14 may provide a DC voltage while the electric motors 4 may require a three-phase AC current to function. The power electronics module 16 may convert the DC voltage to a three-phase AC current as required by the electric motors 4. In a regenerative mode, the power electronics module 16 will convert the three-phase AC current from the electric motors 4 acting as generators to the DC voltage required by the battery pack 14. The methods described herein are equally applicable to a pure electric vehicle or any other device using a battery pack.

In addition to providing energy for propulsion, the battery pack 14 may provide energy for other vehicle electrical systems. A typical system may include a DC/DC converter module 18 that converts the high voltage DC output of the battery pack 14 to a low voltage DC supply that is compatible with other vehicle loads. Other high voltage loads, such as compressors and electric heaters, may be connected directly to the high-voltage bus from the battery pack 14. In a typical vehicle, the low voltage systems are electrically connected to a 12V battery 20. An all-electric vehicle may have a similar architecture but without the engine 8.

The battery pack 14 may be recharged by an external power source 26. The external power source 26 may provide AC or DC power to the vehicle 2 by electrically connecting through a charge port 24. The charge port 24 may be any type of port configured to transfer power from the external power source 26 to the vehicle 2. The charge port 24 may be electrically connected to a power conversion module 22. The power conversion module may condition the power from the external power source 26 to provide the proper voltage and current levels to the battery pack 14. In some applications, the external power source 26 may be configured to provide the proper voltage and current levels to the battery pack 14 and the power conversion module 22 may not be necessary. The functions of the power conversion module 22 may reside in the external power source 26 in some applications.

Figure 2:
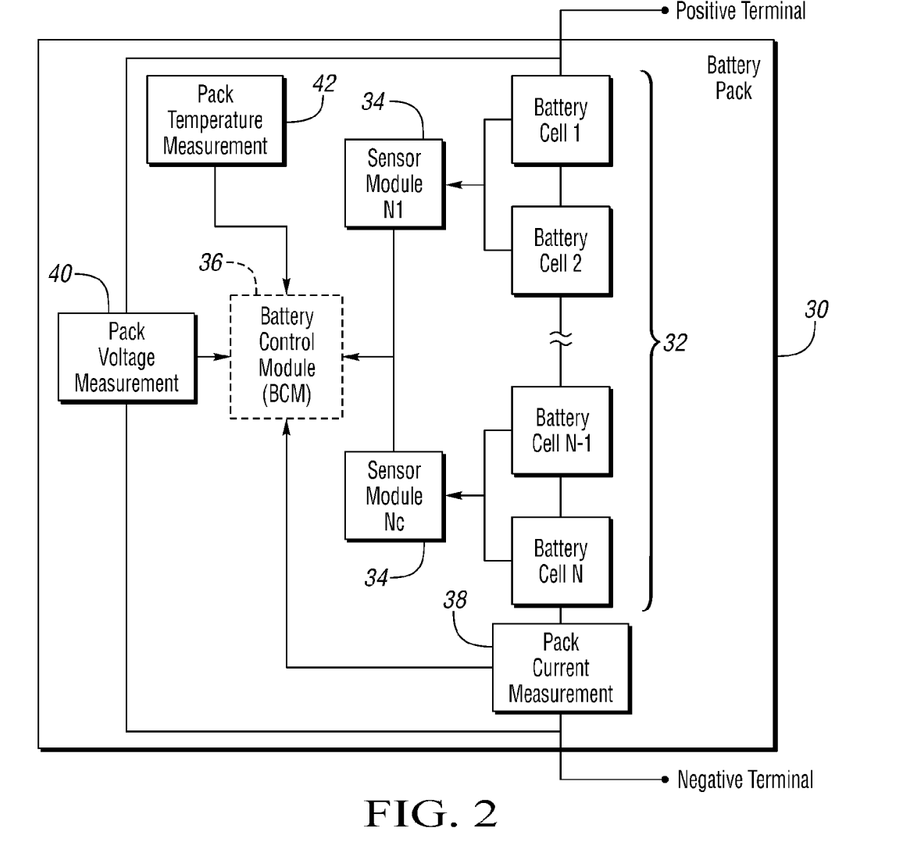
FIG. 2 is a diagram of a possible battery pack arrangement comprised of multiple cells, and monitored and controlled by a Battery Control Module.

Battery packs may be constructed from a variety of chemical formulations. Typical battery pack chemistries are lead acid, nickel-metal hydride (NIMH) or Lithium-Ion. FIG. 2 shows a typical battery pack 30 in a simple series configuration of N battery cells 32. Other battery packs, however, may be composed of any number of individual battery cells connected in series or parallel or some combination thereof. A typical system may have a one or more controllers, such as a Battery Control Module (BCM) 36 that monitors and controls the performance of the battery pack 30. The BCM 36 may also be referred to as a Battery Energy Control Module (BECM). The BCM 36 may monitor several battery pack level characteristics such as pack current 38, pack voltage 40 and pack temperature 42. The BCM 36 may have non-volatile memory such that data may be retained when the BCM 36 is in an off condition. Retained data may be available upon the next key cycle.

In addition to the pack level characteristics, there may be battery cell level characteristics that are measured and monitored. For example, the terminal voltage, current, and temperature of each cell may be measured. A system may use a sensor module 34 to measure the battery cell characteristics. Depending on the capabilities, the sensor module 34 may measure the characteristics of one or multiple of the battery cells 32. The battery pack 30 may utilize up to $N_c$ sensor modules 34 to measure the characteristics of all the battery cells 32. Each sensor module 34 may transfer the measurements to the BCM 36 for further processing and coordination. The sensor module 34 may transfer signals in analog or digital form to the BCM 36. In some embodiments, the sensor module 34 functionality may be incorporated internally to the BCM 36. That is, the sensor module 34 hardware may be integrated as part of the circuitry in the BCM 36 and the BCM 36 may handle the processing of raw signals.

Figure 3:
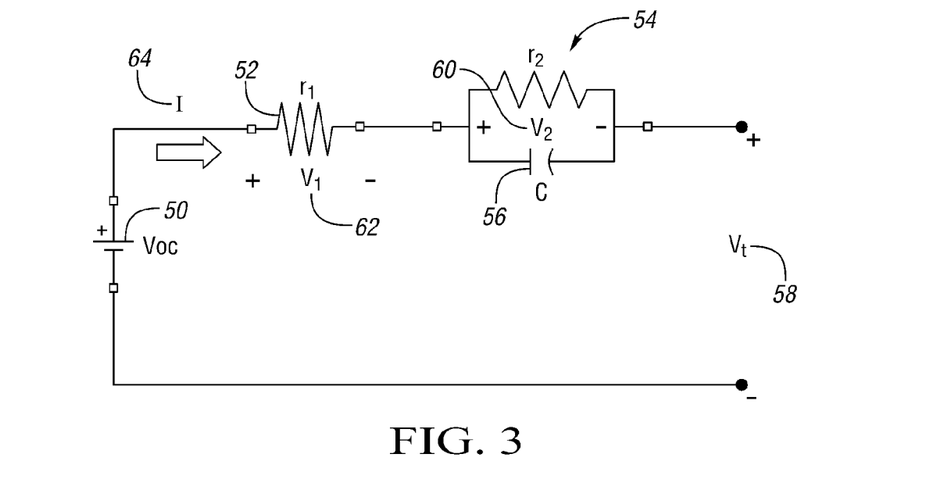
FIG. 3 is a diagram of an example battery cell equivalent circuit.

FIG. 3 shows one possible battery cell equivalent circuit model (ECM). A battery cell can be modeled as a voltage source ($V_{oc}$) 50 having resistances (52 and 54) and capacitance 56 associated with it. Because of the battery cell impedance, the terminal voltage, $V_t$ 58, is typically not the same as the open-circuit voltage, $V_{oc}$ 50. The open-circuit voltage, $V_{oc}$ 50, is not readily measurable as only the terminal voltage 58 of the battery cell is accessible for measurement. Because the $V_{oc}$ 50 is not readily measurable, a model-based method may be used to estimate the value. A model may require that the values of resistance and capacitance be known or estimated. The battery cell model may depend on the battery chemistry. The precise model chosen for the battery cell is not necessarily critical to the methods described.

Figure 4:
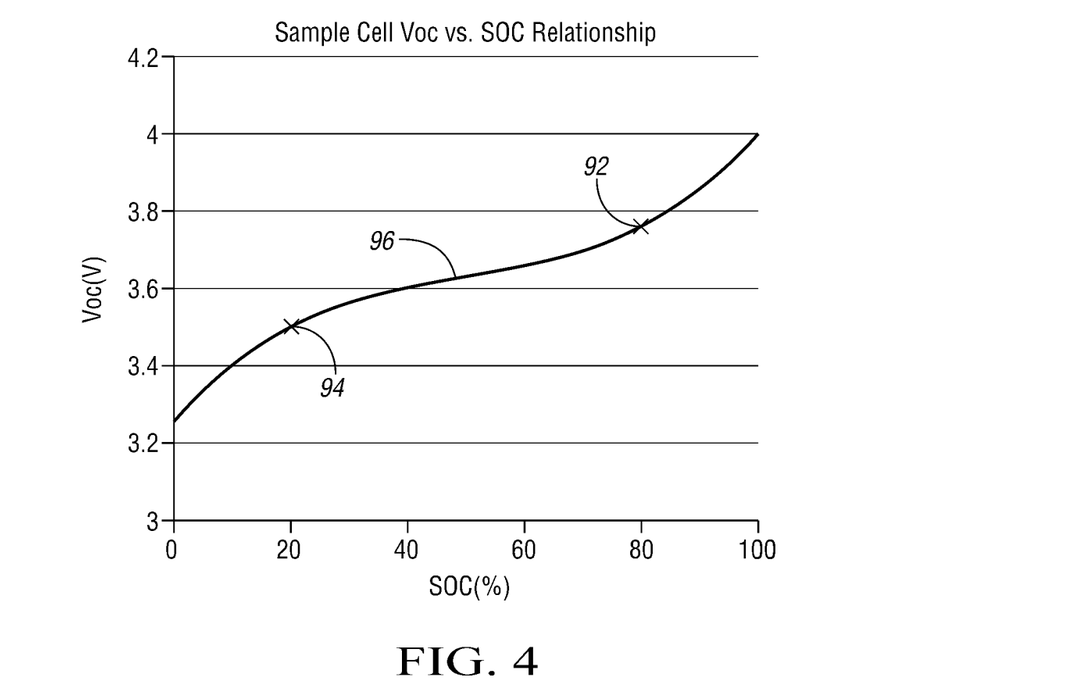
FIG. 4 is a graph that illustrates a possible open-circuit voltage (Voc) vs. battery state of charge (SOC) relationship for a typical battery cell.

For a typical Lithium-Ion battery cell, there is a relationship between SOC and the open-circuit voltage ($V_{oc}$) such that $V_{oc}$=f(SOC). FIG. 4 shows a typical curve 96 showing the open-circuit voltage $V_{oc}$ as a function of SOC. The relationship between SOC and $V_{oc}$ may be determined from an analysis of battery properties or from testing the battery cells. The function may be such that SOC may be calculated as $f^{-1}(V_{oc})$. The function or the inverse function may be implemented as a table lookup or an equivalent equation. The exact shape of the curve 96 may vary based on the exact formulation of the Lithium-Ion battery. The voltage $V_{oc}$ changes as a result of charging and discharging of the battery.

The governing equations for the equivalent circuit model may be written as follows:

$$\dot{V}_2 = -\frac{1}{r_2 C}V_2 + \frac{1}{C}I \tag{1}$$

$$V_{oc} - V_t = V_2 + Ir_1 \tag{2}$$

where: $V_2$ 60 is a voltage across C 56 or $r_2$ 54 from the circuit model;

$$\dot{V}_2 = \frac{dV_2}{dt}$$

is the time based derivative of $V_2$ 60; $r_2$ 54 is a charge transfer resistance of the battery; C 60 is a double layer capacitance of the battery; I 64 is the measured battery current; $V_{oc}$ 50 is the open circuit voltage of the battery; $V_t$ 58 is the measured battery voltage across the battery terminals (terminal voltage); and $r_1$ 52 is an internal resistance of the battery.

In a typical battery system, some values, such as current I 64 and terminal voltage $V_t$ 58 may be measured directly. However, the resistance and capacitance values may vary over time and are not readily measurable. A battery impedance parameter estimation model may be required to calculate the impedance parameters of the battery. One method of estimating the parameters of a system is to utilize a recursive parameter estimation method, such as an Extended Kalman Filter. For example, an EKF may be constructed that uses the current I 64 as an input, voltage $V_2$ 60 as a state, and $V_{oc}$-$V_t$ as an output. The battery ECM impedance parameters ($r_1$ 52, $r_2$ 54, and C 56) or combinations of the parameters may also be treated as states for identification. Once the parameters and states have been identified, a battery power capability may be calculated based on the operating limits of a battery voltage and current, and the current battery state.

An EKF is a dynamic system, that is governed by the following equations:

$$X_k = f(X_{k-1}, u_{k-1}, w_{k-1}) \tag{3}$$

$$Y_k = h(X_k, v_{k-1}) \tag{4}$$

where: $X_k$ includes the state $V_c$ and the other three battery ECM Parameters; $u_k$ is the input (e.g., battery current); $w_k$ is the process noise; $Y_k$ is the output ($V_{oc}$-V); and $v_k$ is the measurement noise.

The states of the estimation model may be chosen to allow one or more of the battery impedances to be calculated either directly or indirectly. One such system of equations for the battery model as considered can be shown as follows:

$$X = \begin{bmatrix} x_1 \\ x_2 \\ x_3 \\ x_4 \end{bmatrix} = \begin{bmatrix} V_2 \\ \frac{1}{r_2 C} \\ \frac{1}{C} \\ r_1 \end{bmatrix} \tag{5}$$

The corresponding state space equation, in discrete or continuous time, can be obtained in the form of equations (3) and (4).

Based on the system model shown in equations (3) and (4), an observer may be designed to estimate the extended states ($x_1$, $x_2$, $x_3$ and $x_4$), and correspondingly ($V_2$, $r_1$, $r_2$, and C), according to equations (6)-(9) as shown below:

$$(\hat{V}_2) = x_1 \tag{6}$$

$$(\hat{r}_1) = x_4 \tag{7}$$

$$(\hat{r}_2) = \frac{x_3}{x_2} \tag{8}$$

$$(\hat{C}) = \frac{1}{x_3} \tag{9}$$

The complete set of EKF equations consists of time update equations and measurement update equations. The EKF time update equations project the state and covariance estimate from the previous time step to the current step:

$$\hat{x}_k^- = f(\hat{x}_{k-1}, u_{k-1}, 0) \tag{10}$$

$$P_k^- = A_k P_{k-1} A_k^T + W_k Q_{k-1} W_k^T \tag{11}$$

where: $\hat{x}_k^-$ represents a priori estimate of $x_k$; $P_k^-$ represents a priori estimate error covariance matrix; $A_k$ represents the Jacobian matrix of the partial derivatives of function f(X, u, w) with respect to X; $P_{k-1}$ represents a posteriori estimate error matrix of last step; $A_k^T$ represents transpose of matrix $A_k$; $W_k$ represents the Jacobian matrix of the partial derivatives of function f(X, u, w) with respect to process noise variable w; $Q_{k-1}$ represents a process noise covariance matrix, and $W_k^T$ represents transpose of matrix $W_k$.

The measurement update equations correct the state and covariance estimate with the measurement:

$$K_k = P_k^- H_k^T (H_k P_k^- H_k^T + V_k R_k V_k^T)^{-1} \tag{12}$$

$$\hat{x}_k = \hat{x}_k^- + K_k(z_k - h(\hat{x}_k^-, 0)) \tag{13}$$

$$P_k = (I - K_k H_k)P_k^- \tag{14}$$

where: $K_k$ represents the EKF gain; $H_k$ represents the Jacobian matrix of the partial derivatives of h with respect to X; $H_k^T$, is the transpose of $H_k$; $R_k$ represents a measurement noise covariance matrix; $V_k$ represents the Jacobian matrix of the partial derivatives of h with respect to measurement noise variable v; and $V_k^T$ is the transpose of $V_k$.

The first order differential equations (1) and (2) may be solved using the estimated battery ECM impedance parameters of equations (6)-(9) to yield an expression for the battery current. The battery power capability may then be calculated based on the estimated ECM impedance parameters.

The first order differential equation from equations (1) and (2) can be solved using the estimated battery ECM impedance parameters of equations (6)-(9) to yield the following expression for the battery current (I).

$$I = \frac{\left(V_{oc} - V_t - \hat{V}_2(0)e^{-t_d/(\hat{r}_2 * \hat{C})}\right)}{\left[\hat{r}_1 + \hat{r}_2\left(1 - e^{-t_d/(\hat{r}_2 * \hat{C})}\right)\right]} \quad (15)$$

where: td is a predetermined time value; $\hat{V}_2(0)$ is the present value of V2, and e is the base of the natural logarithm.

In general, once the value for I from equation (15) is determined, the battery power capability can be found. Where it is desired to determine a charge power capability for the battery, equation (15) can be solved for a minimum value of I, such as shown in equation (16). By convention, current is defined as a positive (+) quantity when flowing away from a battery (discharge), and as a negative (−) quantity when flowing into the battery (charge).

$$I_{min}(t_d, V_{max}) = \frac{V_{oc} - V_{max} - \hat{V}_2(0)e^{-t_d/(\hat{r}_2\hat{C})}}{\left[\hat{r}_1 + \hat{r}_2\left(1 - e^{-t_d/(\hat{r}_2\hat{C})}\right)\right]} \leq 0 \quad (16)$$

where: the value of $(t_d)$ is predetermined, and may be for example, between 1 sec. and 10 sec., and $V_{max}$ is a maximum operating voltage for the battery, and may be considered a limiting battery voltage.

This current is then compared with a system charge current limit $(I_{lim\_ch})$. If $I_{min}(t_d, V_{max}) < I_{lim\_ch}$, a second voltage value is calculated according to equation (17), as shown below:

$$\overline{V}_{ch} = V_{oc} - \hat{V}_2(0)e^{-t_d/(\hat{r}_2\hat{C})} - I_{lim\_ch} * \left[\hat{r}_1 + \hat{r}_2\left(1 - e^{-t_d/(\hat{r}_2\hat{C})}\right)\right] \quad (17)$$

The time value $(t_d)$ can be based on how battery power capabilities are used by vehicle system controller. The voltage $(V_{max})$ may be determined, for example, by a vehicle manufacturer or a battery manufacturer as the maximum voltage that the battery is allowed to reach.

The charge power capability $(P_{cap\_ch}(t_d))$ for a battery as a function of time $(t_d)$ can be written in accordance with equation (18).

$$P_{cap\_ch}(t_d) = \begin{cases} |I_{min}| * V_{max} & \text{if } I_{min} \geq I_{lim\_ch} \\ |I_{lim\_ch}| * \overline{V}_{ch} & \text{Otherwise} \end{cases} \quad (18)$$

In addition to determining a charge power capability for a battery, a method for determining a discharge power capability for the battery may also be provided. For determining the discharge power capability, a maximum value of the battery current I may be used in conjunction with a minimum value of the battery voltage. Equation (15) can be used to solve for $I_{max}$ as shown in equation (19).

$$I_{max}(t_d, V_{min}) = \frac{\left(V_{oc} - V_{min} - \hat{V}_2(0)e^{-t_d/(\hat{r}_2\hat{C})}\right)}{\left[\hat{r}_1 + \hat{r}_2\left(1 - e^{-t_d/(\hat{r}_2\hat{C})}\right)\right]} \quad (19)$$

where: $V_{mm}$ is a minimum operating voltage of the battery pack.

This current is then compared with a system discharge current limit $I_{lim\_dch}$. If $I_{max}(t_d, V_{min}) > I_{lim\_dch}$, a second voltage value is calculated according to equation (20) as shown below:

$$\overline{V}_{dch} = V_{oc} - \hat{V}_2(0)e^{-t_d/(\hat{r}_2\hat{C})} - I_{lim\_dch} * \left[\hat{r}_1 + \hat{r}_2\left(1 - e^{-t_d/(\hat{r}_2\hat{C})}\right)\right] \quad (20)$$

The discharge power capability $(P_{cap\_dch}(t_d))$ for the battery as a function of the time $(t_d)$ can be determined as shown in equation (21).

$$P_{cap\_dch}(t_d) = \begin{cases} |I_{max}| * V_{min} & \text{if } I_{max} \leq I_{lim\_dch} \\ |I_{lim\_dch}| * \overline{V}_{dch} & \text{Otherwise} \end{cases} \quad (21)$$

Equations (15)-(21) calculate power capability based on the battery ECM impedance parameters (e.g., $r_1$, $r_2$ and C) that are estimated by the EKF (equations (6)-(9)). Note that other calculation methods may be possible. The above calculation scheme is merely representative of using a battery impedance parameter estimation model to calculate battery power capability.

The battery may then be operated based on the calculated battery power capability. That is, battery current and voltage may be maintained so as not to exceed the battery power capability. Electrical loads receiving power from or providing power to the battery may be operated such that the total power of all loads falls within the calculated battery power capability. For example, electric machines may have power limits reduced so that the battery power capability is not exceeded.

The above is an example of using an EKF to estimate the states and impedance parameters of a battery ECM. The impedance parameters are a function of the ECM that is chosen. The methods described below are applicable to other battery circuit model formulations as well. For example, the states may be defined differently having more or less states or parameters to estimate. In addition, the battery power capability estimate may be adjusted to correspond to the particular formulation used.

The battery power capability is an important quantity for effectively controlling the powertrain. The above description is one example of using an Extended Kalman Filter (EKF) to identify battery equivalent circuit model impedance parameters and calculating the related battery power capabilities from the battery impedance parameters. The EKF may require some time to converge to the true parameter values. The convergence time may be a function of the starting values that are used to initialize the EKF. The convergence of the EKF may be influenced by an efficient choice of the initial parameter values.

An estimate of battery power capability may be required before the EKF has converged. For an initial period following vehicle initialization the values calculated by the battery impedance parameter estimation model may vary until the final values are learned. Vehicle initialization may include the driver cycling the ignition to an on condition, insertion of a charger into a vehicle charge port for charging the vehicle, or any other condition that may cause the vehicle to switch from an off state to an on or ready state. During this initial period following vehicle initialization, an alternative means of calculating the battery power capability may be desirable.

Prior to convergence of the EKF, battery power capability may be calculated using impedance parameters derived from previously learned impedance parameter values and predetermined impedance parameter values. Likewise, initialization of the battery impedance parameter model may be based on previously learned impedance parameter values and predetermined impedance parameter values. The previously learned impedance parameters may be historical impedance parameters learned during previous ignition cycles. The predetermined impedance parameters may be based on laboratory testing and/or simulation results. Battery impedance parameters may be characterized based on state of charge, temperature and degradation state of the battery.

Between vehicle initialization events, the environmental conditions that the battery experiences may change. The temperature at vehicle initialization may be different than the temperature at the last vehicle shutdown. The battery state of charge (SOC) may also have changed. The change in SOC may be due to self-discharge, charging of the battery, cell balancing, and/or power draw from on-board modules while the vehicle is off. It is possible that an internal fault may develop in a cell. The result of these changes is that the battery may exhibit different behavior in the present ignition cycle as compared to preceding ignition cycles. For example, a change in temperature may lead to a change in the internal resistance of the battery. Due to these changes, the learned equivalent circuit model battery impedance parameters from the last ignition cycle may not be suitable values for a subsequent ignition cycle.

Because of the changes that may occur at rest, it may be desirable to re-learn the battery equivalent circuit model parameters and states after each vehicle initialization event. After each vehicle initialization event, an EKF may be operated to learn the parameters and states of the battery. The EKF may require a certain amount of time after the vehicle initialization event to stabilize at the true parameters and states of the battery. During this learning time, the on-board controller may have to produce battery power capability estimations using a method other than the EKF.

A Lithium-ion battery may be modeled in different ways. An example of a battery model is a simplified Randle's circuit model as shown in FIG. 3. The model impedance parameters may depend on state of charge, temperature and stage of battery life. An impedance parameter vector, $\theta$, may be comprised of battery impedance parameters, such as resistances and capacitances, and battery circuit states, such as voltages or currents. The specific values of the impedance parameter vector, $\theta$, may be based on battery conditions such as state of charge, temperature and stage of life.

Figure 5:
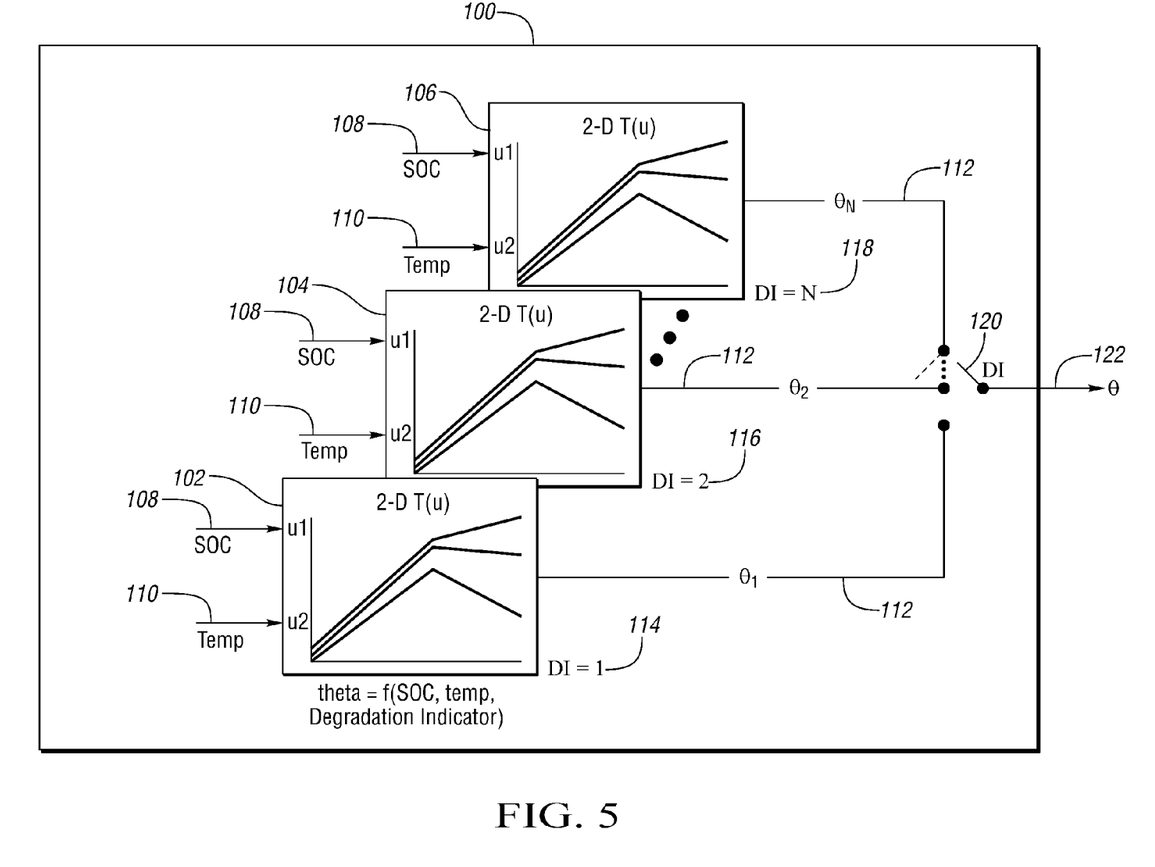
FIG. 5 is a diagram showing a possible arrangement of a series of tables based on cycle life testing.

FIG. 5 depicts a series of predetermined impedance parameter tables 100 that may be defined where each separate table may represent a different stage of battery life. The set of predetermined impedance parameter data may be stored in non-volatile memory of the controller. A table may be selected from the set by the use of a degradation indicator (DI) 120 input. The degradation indicator 120 may determine which predetermined impedance parameter table is to be selected. The degradation indicator 120 may act as a switch that connects the output 112 of one of the set of predetermined impedance parameter tables to an output predetermined impedance parameter vector 122. Any number of tables may be stored and the number of tables may be referred to as N. Each of the N tables may represent a different age of the battery. A table indexed with a degradation indicator of one (114) may represent beginning of life battery impedance parameters from testing or simulation. A table indexed with a degradation index of N (118) may represent end of life battery impedance parameters from testing or simulation. The algorithm may be used even if only one table is defined (N=1) in which case, only one predetermined table is used.

Each separate predetermined impedance parameter table may be indexed by state of charge 108 and temperature 110 to generate an impedance parameter vector 112. That is, for a specific state of charge 108 and temperature 110, there is defined a parameter value for each element of the parameter vector 112. The impedance parameter vector 112 may represent the states of the EKF. For a given degradation indicator 120, there may a separate predetermined table for each element of the parameter vector 112. The controller may have a table look-up routine that allows a state of charge 108 and temperature 110 to be input. Once a specific table (102, 104, 106) is selected, the state of charge 108 and temperature 110 may be used to index into the selected table. Based on the stored table data indexed as a function of state of charge 108 and temperature 100, each element of the predetermined parameter impedance vector may be determined.

For state of charge 108 and temperature 110 values that are not directly stored in the table, the output 112 may be interpolated between the two nearest stored values. Alternatively, the state of charge and temperature may be rounded to the nearest value that is stored so that the output value is in the table. The output is a parameter vector 122 containing a value for each state. In the EKF scheme described above, four output states or parameters would be generated from the tables. The degradation indicator as defined later may have a non-integer value. In the case of a non-integer degradation indicator, the values may be interpolated between the two nearest table index values. For example, a degradation indicator or 1.5 may read the value from the DI=1 114 table for a parameter and the value from the DI=2 116 table for the same parameter. The parameter value to be output may be an interpolated value between the two parameter values using standard interpolation techniques.

The predetermined set of impedance parameter tables 100 may be generated from battery life testing or simulation. Tables may be constructed starting from beginning of life 102 all the way to an expected battery end of life 106 condition. Any number of tables in between these extremes may be incorporated. The tables may be stored in non-volatile memory of the controller.

Figure 6:
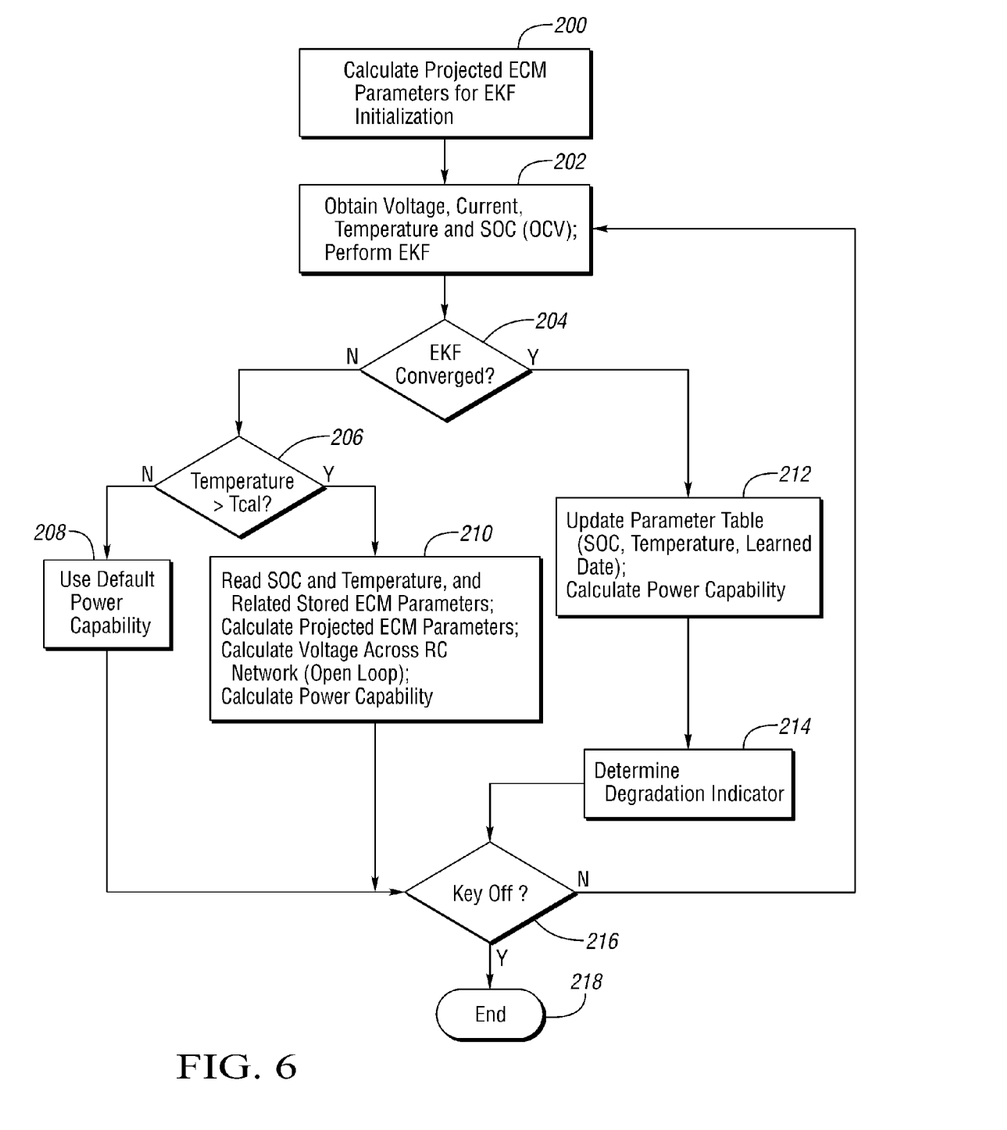
FIG. 6 is a flowchart of a possible sequence of calculating battery power capability.

FIG. 6 shows a flow chart of the algorithm described and represents one example of how the algorithm may be deployed. The algorithm may be run in the BCM or another controller that communicates with the BCM. The first step is to calculate the initial impedance parameter values 200. The initial impedance parameter values may be calculated as:

$$\theta_{init}(SOC,Temp)=(1-\alpha)\theta_{test}(SOC,Temp,DI)+ \alpha\theta_{memory}(SOC,Temp) \quad (22)$$

The value $\alpha$ is a weighting factor based on stored parameters and may be calculated as $e^{-\lambda(tglobal-tstamp)}$. The parameter $\lambda$ is a calibration parameter that may be a function of temperature.

When temperature is above a predetermined threshold, λ may be set to a predetermined value. When temperature is lower than the predetermined threshold, λ may be set infinitely large causing a to be zero. DI represents the degradation indicator that indicates how much the battery has aged in terms of equivalent resistance as calculated during a previous ignition cycle. The initial impedance parameter estimate, $\theta_{init}$, is a weighted function of the parameter values from testing or simulation $\theta_{test}$ and the historical impedance parameter values from one or more previous ignition cycles $\theta_{memory}$. The initial impedance parameter estimate may be used as the starting parameter values for the EKF. The initial value for state $V_2$ (voltage across the RC network) may be set to zero.

During the previous ignition cycle, the ECM parameters with respect to SOC, temperature and time stamp ($t_{stamp}$) may have been learned and stored in non-volatile memory of the controller. The time stamp represents the time that the learned parameters were learned and saved. The time stamp may be a sampled global time period $t_{global}$ (calendar time) that represents the procession of time since the controller has been in use. The global time $t_{global}$ may be generated by the controller or by external sources, such as a cloud computer or internet. The controller may be capable of receiving the global time from an external source. The difference between $t_{global}$ and $t_{stamp}$ represents the relative age of the learned impedance parameters. As the different increase, the weighting factor decreases causing the historical impedance parameters to have less effect on the initial parameter values.

At power up, the controller may calculate the battery SOC and measure the temperature. The degradation indicator may have been calculated and stored in a previous ignition cycle. Using the degradation indicator, SOC and temperature values, initial predetermined impedance parameter values may be calculated from the stored series of tables as described previously.

As battery impedance parameters are learned by operation of the EFK, the presently learned impedance parameters may be stored in non-volatile memory as a dynamic table similar to the predetermined parameter estimates. The dynamic table may be indexed based on state of charge and temperature. Over time, various learned impedance parameter estimates may be written into the dynamic table as a function of SOC and temperature. The dynamic table may represent the historical impedance parameter values. At initialization, the dynamic table may be indexed based on the present SOC and temperature to determine the corresponding historical learned impedance parameter value. The weighting factor may be calculated using the temperature and the time stamp stored with the historical parameters. The weighting factor α will decrease as the time stamp gets older. As time goes by without updating the historical learned impedance parameters at a given SOC and temperature, the reliance on the historical impedance parameters is decreased in favor of the predetermined test parameters. Equation (22) may then be evaluated for the initial impedance parameter values.

After initialization, the EKF may be executed to determine an estimate of the parameters $\theta_{ekf}$ 202. Prior to executing the EKF algorithm, input values such as voltage, current, temperature and SOC may be measured or calculated. The EKF may be evaluated as described previously.

After executing the EKF, the convergence of the EKF may be ascertained 204. There may be multiple methods of determining the convergence of the EKF. One example is to use a smoother filter, such as a Savitzy-Goray filter, to obtain filtered values $\theta_{sg}$ of the EKF estimates $\theta_{ekf}$. A distance between the raw estimated values of $\theta_{ekf}$ and the filtered estimated values $\theta_{sg}$ for each step m may be calculated as:

$$d(m) = \Sigma_{k \in [1,M]} w_k (\theta_{sg} - \theta_{ekf})^2 \quad (23)$$

where M is the total number of parameters estimated by the EKF and $w_k$ is a set of predetermined weighting factors. A sequence of d(m) values may be evaluated for convergence. The sequence of d(m) values may be constructed as the last $M_z$ outputs of the EKF and the filter, where $M_z$ may be a calibratable number. $M_z$ represents the number of points used in determining the EKF learning convergence. The EKF may have converged if the sequence is decreasing and the last value in the sequence is less than a calibrated value d_cal. Otherwise, the EKF may not have converged yet.

If the EKF has not converged, then an alternate means of calculating the power capability without the learned impedance values from the present ignition cycle may be initiated. At low temperatures, battery power capability may not change appreciably over the life of the battery. At low temperatures, a fixed, predetermined value of battery power capability may be used 208. When battery temperature is above a predetermined temperature $T_{cal}$ a more accurate calculation/estimation may be needed over the life of the battery. A default power capability value 208 may be used if a measured temperature associated with the battery is below a predetermined temperature value $T_{cal}$. The default power capability may be based on beginning of life laboratory testing data.

When the measured temperature is above the predetermined temperature value $T_{ca}$, projected impedance parameter values may be calculated and the battery power capability may be calculated based on projected impedance parameter values 210. Historical ECM impedance parameter values that are based on SOC and temperature may be stored from previous ignition cycles along with a time stamp of when the parameters were stored. Projected ECM impedance parameters may be calculated based on stored predetermined impedance values and stored historical parameter values as follows:

$$\theta_{proj}(SOC,Temp) = (1-\alpha)\theta_{test}(SOC,Temp,DI) + \alpha\theta_{memory}(SOC,Temp) \quad (24)$$

The voltage across the RC network, $V_2(k)$, may be calculated as $(1 - T_s/(r_2 C)) V_2(k-1) + (T_s * I(k))/C$ where $T_s$ is the sampling period used for the EKF. $V_2(k)$ represents the presently calculated value of voltage $V_2$ and $V_2(k-1)$ represents the value of voltage $V_2$ calculated at the last sample time. After $V_2(k)$ is calculated, $V_2(k-1)$ may be set equal to $V_2(k)$ for the next interval. Power capability may then be estimated using the impedance parameter values from $\theta_{proj}$ and $V_2(k)$ as described previously. During this time, it is possible that SOC and temperature are changing so that the impedance parameter values may vary. Equation (24) is the same as equation (22) except that equation (24) may be evaluated for a period of time after vehicle initialization as opposed to only at vehicle initialization.

If the EKF has converged, the filtered learned parameters $\theta_{sg}$ may be written into the dynamic table with a time stamp 212. The time stamp may be a global time sample at the time learning is completed or at the time the values are stored. Power capability may be calculated using the presently learned parameter values as described previously. The system may store one dynamic table $\theta_{memory}$ that is based on the learned values $\theta_{sg}$ over time. The dynamic table may be initialized with the parameter values from the beginning of life test data. The learned values may each correspond to a particular SOC and temperature. The dynamic table value at the particular SOC and temperature value may be updated after the values are learned. Each dynamic table value may have a corresponding time stamp to indicate when the data was stored. Over time, the dynamic table may contain impedance parameter data for many combinations of SOC and temperature.

The degradation indicator (DI) may be calculated based on the filtered estimated parameter vector $\theta_{sg}$ with components $k \in [1, M]$. M represents the number of states or parameters of the EKF. A first step may be to select the table of predetermined parameter values that is closest to the learned parameter values. A distance formula between the predetermined impedance parameter values and the learned impedance parameter values may be defined. One example of a distance formula is described below. A corresponding degradation indicator may be found by searching, first, for the closest predetermined impedance parameter table index, j*, that satisfies:

$$\min_{j \in [1,N]} \Sigma_{k \in [1,M]} Z_k (\theta_{sg}(SOC, Temp, k) - \theta_{test}(SOC, Temp, k, j))^2 \quad (25)$$

where N is the total number of predetermined impedance parameter tables provided from laboratory testing or simulation reflecting the available battery ECM impedance parameter values throughout battery life. For each parameter (1 through M) in the parameter set $\theta_{sg}$, the distance between the learned impedance parameter and the predetermined impedance parameter is squared. Each distance squared is weighted by $Z_k$ and then summed together. The selected predetermined test data set is the one whose sum is the minimum of all the tables. The j* value points to the table of predetermined impedance parameters that is closest to the presently learned impedance parameters. Once j* is calculated, the degradation indicator may be calculated as follows:
j*=1:

$$DI = 1 + \frac{\sum_{k \in [1,M]} Z_k(\theta_{sg}(SOC, Temp, k) - \theta_{test}(SOC, Temp, k, 1))^2}{\sum_{k \in [1,M]} Z_k(\theta_{test}(SOC, Temp, k, 2) - \theta_{test}(SOC, Temp, k, 1))^2} \quad (26)$$

such that $1 \leq DI \leq 2$.
j*=N:

$$DI = (N - 1) + \quad (27)$$

$$\frac{\sum_{k \in [1,M]} Z_k(\theta_{sg}(SOC, Temp, k) - \theta_{test}(SOC, Temp, k, N-1))^2}{\sum_{k \in [1,M]} Z_k \left( \begin{matrix} \theta_{test}(SOC, Temp, k, N) - \\ \theta_{test}(SOC, Temp, k, N-1) \end{matrix} \right)^2}$$

such that $N-1 \leq DI \leq N$.
1<j*<N:

$$DI = (j^* - 1) + 2 * \frac{\sum_{k \in [1,M]} Z_k \left( \begin{matrix} \theta_{sg}(SOC, Temp, k) - \\ \theta_{test}(SOC, Temp, k, j^* - 1) \end{matrix} \right)^2}{\sum_{k \in [1,M]} Z_k \left( \begin{matrix} \theta_{test}(SOC, Temp, k, j^* + 1) - \\ \theta_{test}(SOC, Temp, k, j^* - 1) \end{matrix} \right)^2} \quad (28)$$

such that $(j^*-1) \leq DI \leq (j^*+1)$.

An alternative calculation may be to, after determining a j*, divide the range [j*−1, j*+1] into $N_z$ intervals where $\Delta j$ is $2/N_z$. For each of the $N_z$ intervals, the parameters based on the predetermined parameter values $\theta_{test}$ may be found by interpolating the data between the values from (j*−1) and (j*+1).

The distance between the learned value $\theta_{sg}$ and each of the interpolated $N_z$ predetermined look-up parameter values may be calculated as described above in equation (25). The index, $j_z$, where $j_z$ is an integer from 0 to $N_z$, where the distance is minimized may be chosen. The DI value is then $(j^*-1+j_z\Delta j)$. Another alternative may be to select the value of j* as determined above as the DI.

The degradation indicator is not limited to an integer value. Often times, the learned impedance parameter values may not fall exactly in any of the stored predetermined impedance parameter tables as the stored tables are snapshots of the impedance parameters at various time points in the life of the battery. Therefore, the true parameter value may lie between table values. Each stored predetermined parameter table may represent the parameter values at a specific battery age. The degradation indicator may provide an indication of what stage of aging that the battery was at in the previous ignition cycle.

If an ignition-off condition occurs, the learning process may end. Before ending, the learned EKF values may be stored to non-volatile memory for use in the next ignition cycle. In addition, the degradation index may be stored to non-volatile memory for use in the next ignition cycle.

During a previous drive cycle or ignition cycle, the learned ECM parameters may be saved as the historical impedance parameters in non-volatile memory with a time stamp. A degradation indicator may be calculated based on the ECM identification, laboratory test data or simulation generated data and stored. At ignition on, the controller may read a battery controller global time, $t_{global}$, state of charge and temperature. A set of projected ECM impedance parameters may be obtained based on the stored values. The corresponding historical impedance parameters, $\theta_{memory}$, may be read from memory. A weighting factor, a, may be calculated based on the time stamp of the historical ECM parameters. Predetermined impedance parameters may be determined from laboratory testing or simulation and a degradation indicator. The projected parameter values are a weighted function of the historical learned parameters from memory and the predetermined impedance parameters. The projected parameters may be input to the EKF as the initial values and may be used for the default power capability estimation until the EKF has converged. When the EKF has converged, the learned values may be used for the power capability estimation.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a battery; and
at least one controller programmed to, operate the vehicle, for a period of time immediately following vehicle initialization, according to a battery power capability that is based on battery impedance parameters derived from (i) a weighted function of selected predetermined impedance parameters and historical impedance parameters, and (ii) a weighting factor that is based on time data associated with the historical impedance parameters and a temperature of the battery.

2. The vehicle of claim 1 wherein the at least one controller is further programmed to, in response to values of the temperature of the battery being less than a predetermined value during the period of time, calculate the battery power capability based on the predetermined impedance parameters.

3. The vehicle of claim 1 wherein the period of time ends when battery impedance parameters output by a battery parameter estimation model have converged to stable values.

4. The vehicle of claim 1 wherein the at least one controller is further programmed to, after the period of time, calculate the battery power capability based on battery impedance parameters output by a battery impedance parameter estimation model.

5. The vehicle of claim 4 wherein the at least one controller is further programmed to store battery impedance parameters output by the model with associated time data as additional historical impedance parameters.

6. The vehicle of claim 1 wherein the predetermined impedance parameters are selected based on impedance parameters learned during an immediately preceding ignition cycle.

7. The vehicle of claim 1 wherein values of the selected predetermined impedance parameters are based on battery state of charge and battery temperature.

8. The vehicle of claim 1 wherein the historical impedance parameters do not affect battery impedance parameter values when values of the temperature of the battery are less than a threshold.

9. The vehicle of claim 1 wherein recent historical impedance parameters affect values of the impedance parameters more than older historical impedance parameters.

* * * * *